United States Patent
Elsasser (12)

(10) Patent No.: US 6,644,435 B2
(45) Date of Patent: Nov. 11, 2003

(54) COMPOSITE SOUND INSULATION SYSTEM FOR ROOM BOUNDARY SURFACES

(76) Inventor: Manfred Elsasser, Fraubichl 20, A-6082 Patsch (AT)

( * ) Notice: Subject to any disclaimer, the term of this patent is extended or adjusted under 35 U.S.C. 154(b) by 0 days.

(21) Appl. No.: 09/731,754

(22) Filed: Dec. 8, 2000

(65) Prior Publication Data

US 2001/0006132 A1 Jul. 5, 2001

(30) Foreign Application Priority Data

Dec. 29, 1999 (EP) .............................. 99126121

(51) Int. Cl.⁷ .................................. F16F 7/00
(52) U.S. Cl. .................... 181/207; 181/208; 181/290; 428/174
(58) Field of Search ................... 181/207, 208, 181/286, 290, 294; 36/43, 44, 38; 428/174, 137, 158, 219, 220, 332, 340, 354

(56) References Cited

U.S. PATENT DOCUMENTS

| | | | |
|---|---|---|---|
| 4,631,221 A | | 12/1986 | Disselbeck et al. |
| 4,753,841 A | * | 6/1988 | Noel et al. ................... 428/174 |
| 4,803,112 A | | 2/1989 | Kakimoto et al. |
| 5,584,130 A | * | 12/1996 | Perron ........................... 36/44 |

FOREIGN PATENT DOCUMENTS

| | | |
|---|---|---|
| CH | 645 150 A5 | 9/1984 |
| CH | 645 968 A5 | 10/1984 |
| DE | 28 41 208 | 4/1980 |
| DE | 30 38 320 A1 | 6/1982 |
| DE | 33 25 907 A1 | 2/1985 |
| DE | 37 34 797 A1 | 5/1989 |
| DE | 44 11 453 A1 | 10/1995 |
| DE | 196 37 142 A1 | 10/1997 |
| DE | 298 20 016 U1 | 3/1999 |
| WO | WO 01/09461 A1 | 2/2001 |

OTHER PUBLICATIONS

Gosele et al., Research Association Building and Living, Sound, Heat, Humidity: Basics, Experience and Practical Tips, undated.

* cited by examiner

*Primary Examiner*—Khanh Dang
(74) *Attorney, Agent, or Firm*—Oliff & Berridge, PLC

(57) ABSTRACT

The composite sound insulation system for room boundary surfaces includes a sound-proofing layer (D) in communication with the corresponding floor, wall, or ceiling covering (V) which preferably has an inner loss factor $\eta_{int}$ of at least 0.1, and more particularly of at least 0.2, and a footfall sound-proofing layer (S) adjoining the floor, wall, or ceiling covering (V) or the sound-proofing layer (D) on the side facing away from the room and having a dynamic stiffness (s') of at most $20 \text{ MN/imn}^3$, preferably of at most $10 \text{ MN/m}^3$. The floor, wall, or ceiling covering (V) preferably is a paneling having a thickness of at most 40 mm, preferably of at most 20 mm, and more particularly at most 10 mm, which can be made of two parts, in which case (V1, V2) for instance, at least one sound-proofing layer (D) is arranged between the two parts (V1, V2). The footfall sound-proofing layer (S) can be designed as a multiple air blister sheet, where appropriate with at least on intermediate layer, the sound-proofing layer (D) can have a density of $>1600 \text{ kg/imn}^3$, preferably of $>2000 \text{ kg/imn}^3$, and/or a weight per unit area of $>5 \text{ kg/imn}^2$, preferably of $>10 \text{ kg/m}^2$.

18 Claims, 5 Drawing Sheets

COMPOSITE SOUND INSULATION SYSTEM FOR ROOM BOUNDARY SURFACES

BACKGROUND OF THE INVENTION

It is known from civil engineering physics that in buildings, sufficient footfall sound insulation of partition components and—at the same time—a realistic mass of these components can only be attained with multi-shell components (double-shell components, as a rule) or with a combination of heavy single-shell partition ceilings and softly resilient wear surfaces. Double-shell partition ceilings generally are realized as floating floor screeds, and thus as a rule give rise to relatively thick designs which especially in the renovation of old buildings having predetermined joining heights can hardly be installed in practice. When calculating the footfall sound improvement factor ($FSI_{req}$) of multi-shell ceiling covers that is required for the minimum footfall sound insulation of the full structure, not all European countries allow softly resilient wear surfaces to be taken into account. Moreover, such surfaces sometimes are not acceptable or not suitable, particularly so in wet areas (bathrooms).

In recent times, to the contrary, floor and wall coverings which are relatively thin and rigid are increasingly applied, for instance coverings consisting of chipboards or presspan panels in boarding sizes which have extremely hard surfaces, such as laminated plastic. The properties of these floor and wall coverings, which act as single-shell structures, are subjectively unpleasant and critical particularly with respect to footfall sound projection.

In Germany and Austria, floating floor screeds are the technical standard in footfall sound insulation. However, floor coverings cannot be included when technically demonstrating that minimum footfall sound insulation is attained, since they are subject to aging and can be exchanged. The resonant frequency of softly resilient wear surfaces decreases with increasing contact time; this in turn depends on the depth of penetration of the sound-generating object into the surfacing, and this depth in turn will of course be a function of the dimensions and mass of the footfall sound generator. This correlation also constitutes the reason why the results obtained when measuring the sound level reduction by wear surfaces with the aid of a standardized hammer mill basically differ from those obtained when walking on the same partition ceiling structure.

In building practice, thin, rigid wear surfaces can be installed as floating structures when they can guarantee a sufficient load distribution, and thus could basically constitute a solution intermediate between a floating floor screed and a softly resilient wear surface. Today, however, most of these wear surfaces still have the disadvantage with respect to footfall sound insulation that

- on one hand the mass of the load-distributing layer generally is relatively small, and hence the dynamic stiffness of the intermediate layer must be distinctly below 10 $MN/m^3$ in order to attain an acceptable footfall sound improvement factor for the double-shell structure, but traditional footfall sound-proofing materials can provide such an improvement only when used in rather large layer thicknesses resulting, in their turn, in large overall thicknesses of the structure.
- on the other hand the footfall sound properties of the rigid, single-shell wear surface itself are extremely unsatisfactory because of its usually very hard top layer, the associated small depth of penetration of the footfall sound generator (short contact times), and the resulting unfavorable resonant frequency, which can even be felt in a subjective way. Often this becomes noticeable as well in the form of unpleasant walking noise ("rattle") in the room.

The standard DIN 4109 that is applicable when technically demonstrating the sound reduction factor provides examples of ceiling covers that will attenuate footfall sound. For instance, a footfall sound improvement factor of as much as 25 dB can be expected for wooden sub-floors consisting of chipboard panels with a minimum thickness of 22 mm installed so as to be floating over their full surface area on fibrous insulating materials having a dynamic stiffness s' of at most 10 $MN/m^3$. It can already be seen from this example, however, that special precautions will be required in order to attain improvement factors of the same order of magnitude with distinctly thinner floor coverings, such as wood or laminate flooring.

SUMMARY OF THE INVENTION

It has been the task of the invention, therefore, to provide a composite sound insulation system that improves, both the footfall sound insulation and the room acoustics, and this particularly when using thin, hard wear surfaces or wall and ceiling covers. This task is accomplished by the combination of the actions indicated in claim 1. Further developments and improvements of the inventive idea are reflected in the characteristics of the dependent claims. If, in the present application, reference is made to footfall sound insulation, then by analogy, this is meant to include sound insulation as such when speaking of wall or ceiling covers.

When combining a thin sound-proofing layer that has positive effects with respect to the sound projection properties of rigid, acoustically stiff coverings, with a sound-attenuating layer that preferably is also relatively thin, and in particular consists of blister sheet filled with gas or air, one can take advantage of the sound-insulating benefits of double-shell designs while sticking to small design thicknesses which are particularly advantageous for renovations.

Air blister sheets are already known for footfall sound insulation beneath floating floor screeds, for instance from DE-A1-2841208 or CH-B-645968; however, with respect to room acoustics or aerial sound insulation, these proposals do not provide an adequate solution.

On the other hand, in contrast to technical sound-insulation precautions which are state of the art, such as an additional single layer like for instance the air blister sheet in the two documents cited above, or a sound-proofing layer according to DE-U1-29280016 consisting of cork and/or rubber chips bonded with polyurethane or of modified plaster of Paris, in the composite sound insulation system according to the invention, the two parameters chiefly influencing the sound projection properties of acoustically stiff wear surfaces, viz., inner sound attenuation and footfall sound improvement, which as such are known are now made optimizable for individual applications by the functional subdivision among several separate individual layers.

The materials of the first sound-proofing layer which is glued directly onto the bottom side of the wear surface should preferably have a density of more than 1600 $kg/m^3$, which is a high value when considering materials for construction, and at the same time an inner loss factor $\eta_{int}$ of 0.2 to 6.0. The attenuating layers contemplated in the composite sound insulation system according to the invention should advantageously attain masses per unit area of 10 $kg/m^2$ or even less, depending on the layer thickness.

Apart from technical properties relating to thermal insulation and vapor diffusion, the composite sound insulation system according to the invention has three acoustic functions, viz., a) a precaution primarily concerning room acoustics, improving the sound projection properties of thin, rigid and acoustically stiff wear surfaces in the walking space, so as to avoid the rattling noise in the upper frequency range that is relevant to building acoustics, a noise which is typical for such floorings and extremely unpleasant subjectively.

b) a precaution to reduce footfall sound and achieve an acceptable footfall sound improvement factor even in the instance of acoustically stiff wear surfaces (as a variant of the softly resilient wear surfaces used most commonly to this effect in practical applications), c) a precaution that in addition is effective as well with respect to aerial sound insulation.

The composite sound insulation system of the invention, by combining a thin, relatively light load distribution panel with a sound-proofing layer as well as with an air blister sheet of specific dimensions (which must have a dynamic stiffness not exceeding 20, and preferably not exceeding 10 $MN/m^3$), extends the advantages of double-shell designs to flooring structures having relatively low masses per unit area of the individual layers. In specific cases, even a thin but sufficiently rigid wear surface can itself assume the load distribution function.

Starting from above or from inside (that is, always on the side of the room), the composite system according to the invention has the following individual components serving an overall optimization with respect to civil engineering physics of the desired double-shell floor screed layers or ceiling and wall coverings, that is, with respect to water vapor diffusion requirements (climate-dependent protection against humidity), footfall sound protection (sound projection into the room, sound conduction in solids to neighboring rooms) and a desirable, at least modest thermal insulation against heat dissipation or heat transfer:

if applicable, a vapor control or vapor seal (in a possible variant, taking the form of a flat sandwich heating element according to DE-A1-19823498, 19826544 or 19836148);

a sound-proofing layer with high inner loss factor $\eta_{int}$;

a footfall sound insulating layer with low dynamic stiffness s', preferably consisting of blister sheets filled with gas or air.

In view of the fact that the wear surfaces and wall coverings which are intended to be acoustically improved by the composite system according to the invention may also be arranged directly above or in front of external structural components, it is recommended to apply a vapor control or vapor seal on the warm side of the composite system which will basically reduce or better inhibit the diffusion of water vapor to cold structural layers, thus preventing inadmissible condensate formation at the source and minimizing the fungus risk.

The sound-proofing layer has a favorable effect on the resonant frequency and degree of sound projection of single-shell floor and wall coverings which are thin but hard. In another variant, the sound-proofing layer can even be arranged as a top layer on the side of the room, for instance when it exists of polymeric glass which has a high inner loss factor $\eta_{int}$ of about 0.6 combined with sufficient surface hardness and load distribution.

The dynamic stiffness s' $[MN/m^3]$ of conventional footfall sound insulating products having a particular thickness which are commercially available results from a combination of dynamic stiffness of the matrix material and dynamic stiffness of the air present between this material. It is essential that with these products, the dynamic stiffness of the air in turn is strongly influenced by the fact that this air can escape along the borders of the conventional footfall sound-proofing panels. The present invention rests on the realization that functional footfall sound-proofing sheets, preferably suitable for rolling and in relatively small thicknesses between 5 and maximally 20 mm (preferably about 10 mm), can be produced and provide a dynamic stiffness of less than 10 $MN/m^3$ when plastic blister sheet is used instead of e.g. fibrous insulating materials or fulled cellular plastic foams. In contrast to traditional air blister sheets which have become known from the packaging industry or for applications as insoles from U.S. Pat. No. 5,584,130, the gas or air-filled blisters of such footfall sound-proofing layers according to the invention which are intended for building applications are intentionally adjusted in their relative diameters, heights, and distances in such a way that the combination of matrix stiffness of the plastic sheet used, of dynamic stiffness of the gas (or air) enclosed in the blisters, and finally also of dynamic stiffness of the air present between the blisters when the sheet is installed, will result in a dynamic stiffness of less than 20, and preferably $\leq 10$ $MN/m^3$. This can be achieved, either already with a single-layer blister sheet or with a combination of two or more blister sheets.

In buildings, of course, the durability of footfall sound-proofing blister sheets will be a decisive practical factor in addition to its dynamic stiffness s'. To this end the thickness of the plastic sheets used must be so selected that the degree of filling of the blisters will be sufficiently constant over the relevant period of time, and the carrying capacity of the installed blister sheet will remain sufficiently large and stable.

The thermal protection that can be achieved with thin footfall sound-proofing blister sheets can be improved by lamination with top coatings if the side of these coatings facing the blisters has a high relative emission coefficient $\epsilon_r$ (as close as possible to unity). This serves to minimize the fraction of global heat transfer due to heat radiation by the air layer present between blisters, the other fractions being due to convection and heat conduction.

BRIEF DESCRIPTION OF THE DRAWINGS

The invention is explained in greater detail with the aid of the accompanying drawing in which.

DETAILED DESCRIPTION OF THE PREFERRED EMBODIMENTS

Figure 1:
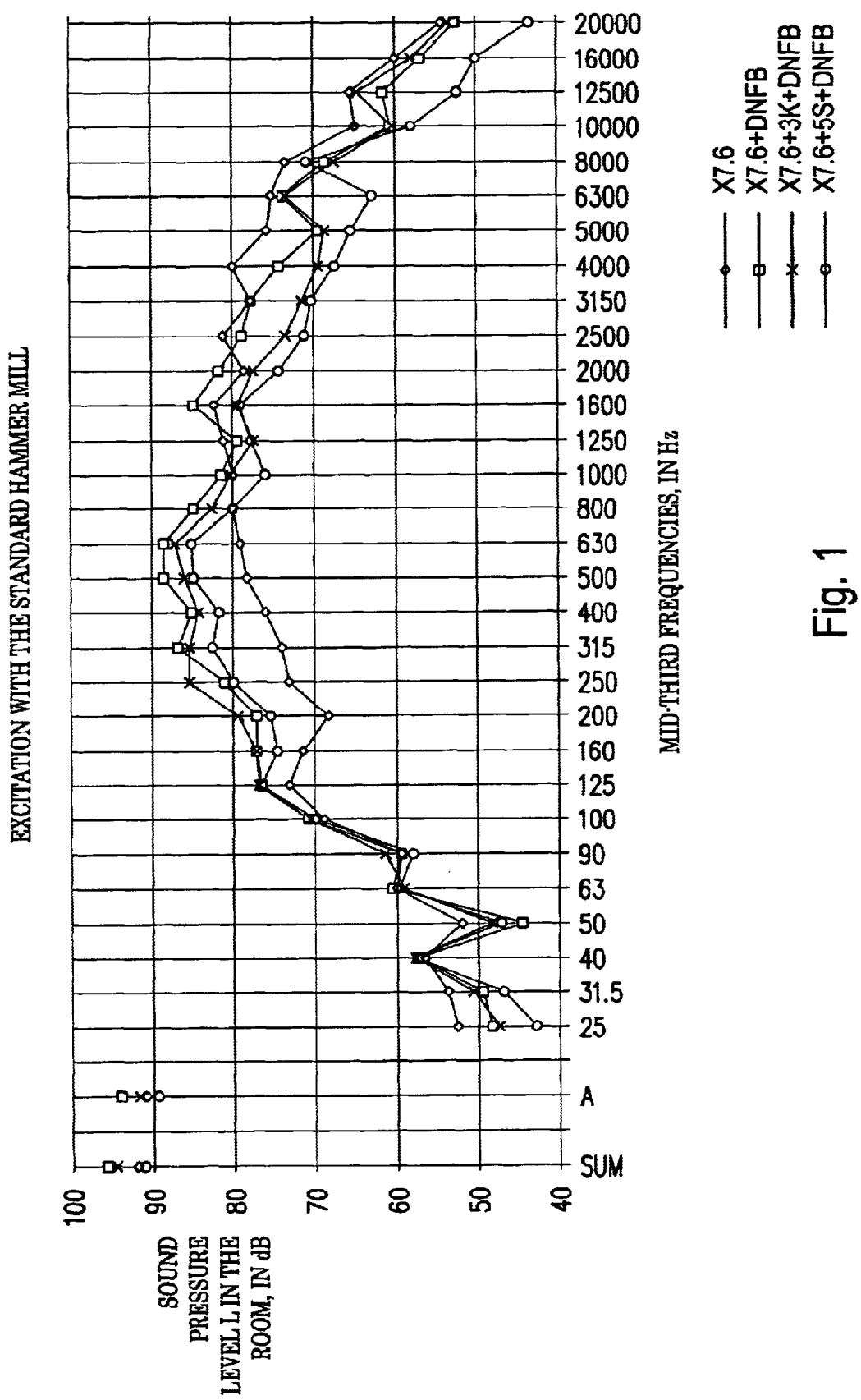
FIGS. 1 to 4 show diagrammatically the effects of the composite sound insulation system according to the invention in comparison with conventional structures.

FIG. 1 shows the sound pressure levels (in dB) arising at a distance of 1 m from the standard hammer mill in the walking room with always the same rigid, acoustically stiff wear surface X7.6 (a highly dense fiberboard with 1 mm laminated plastic top layer, total thickness 7.6 mm), as functions of the mid-third frequencies in Hz. For the purposes of comparison, the standard hammer mill is used even if, as mentioned previously, this is not fully relevant for room acoustics; the four variants are covering X7.6 alone;

covering X7.6 with an air blister double sheet DNFB about 10 mm thick (s'~20 MN/m³);

covering X7.6 with a cork mat 3K 3 mm thick, having a density of 890 kg/m³ (corresponding to a mass per unit area of 2.67 kg/m²) and an inner loss factor $\eta_{int}$ of only about 0.16, and with the same air blister sheet DNFB;

covering X7.6 with a bituminous mat 5S 5 mm thick, having a density of 2008 kg/m³ (corresponding to a mass per unit area of 10.04 kg/m²) and an inner attenuation factor of 4.0, and with the same air blister sheet DNFB.

Figure 2:
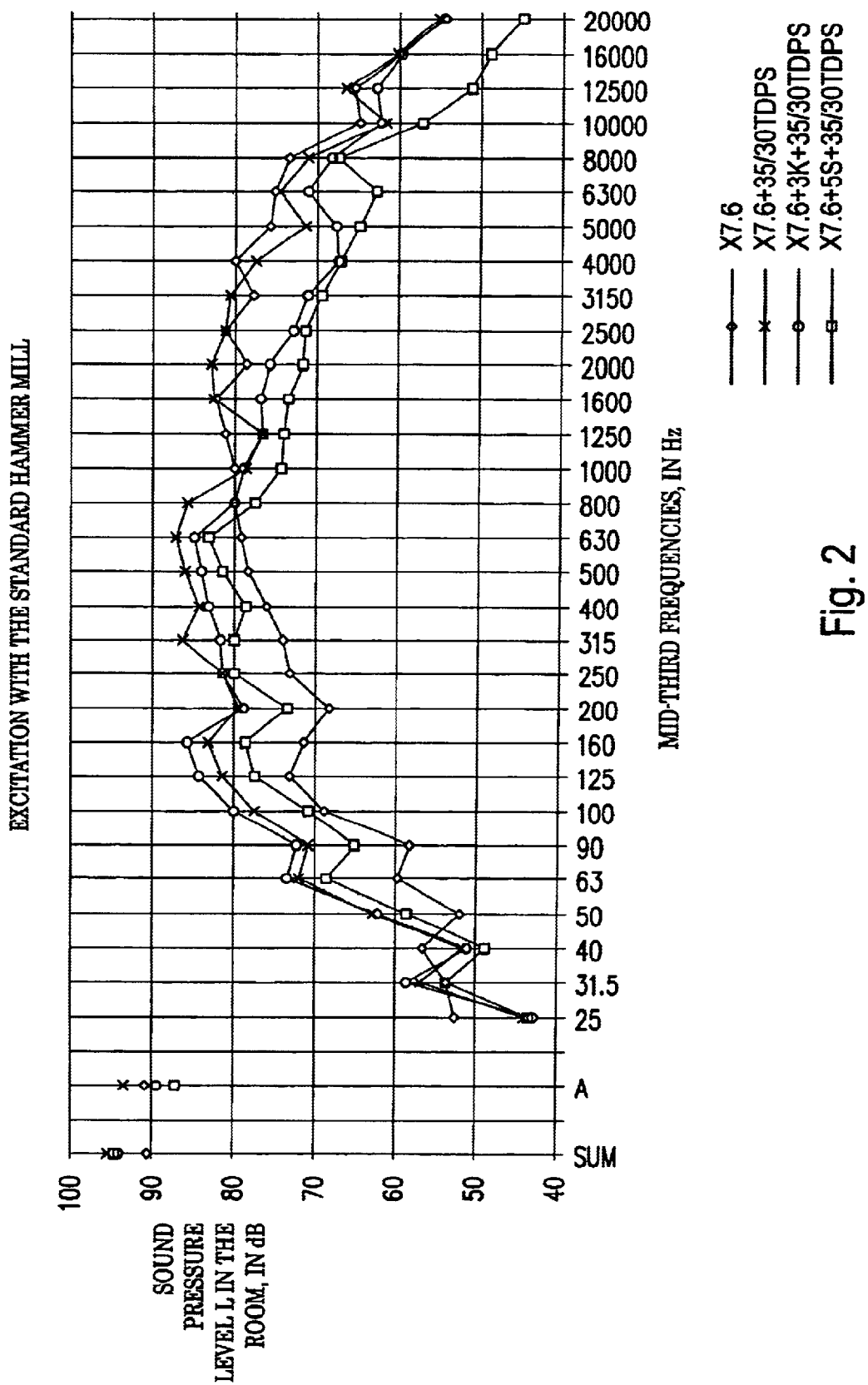
Figure 3:
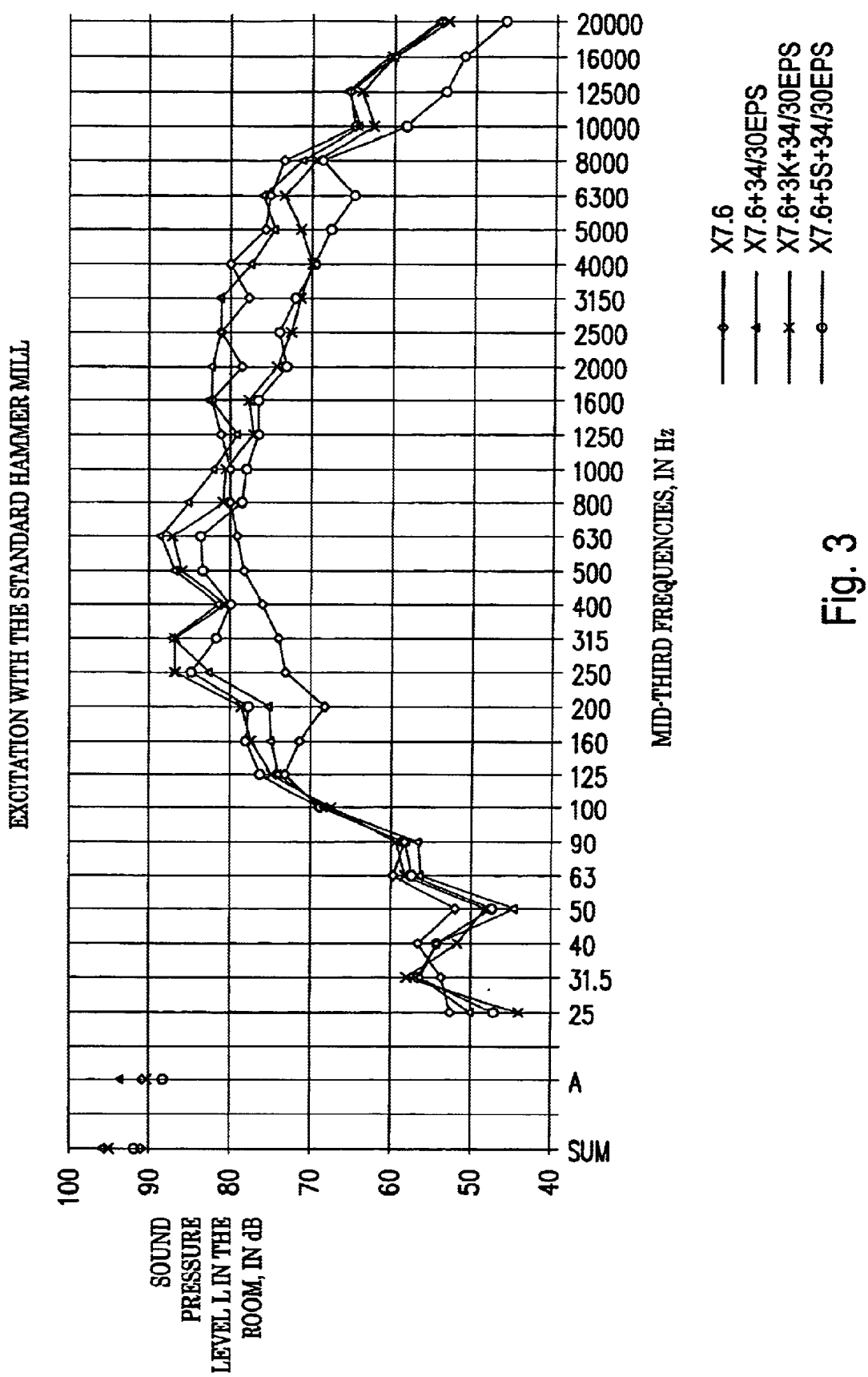

FIG. 2 shows the analogous values found when instead of the air blister foil DNFB a mineral fiber insulating panel TDPS 35/30 mm (s'~7.5 MN/m³) is used, and FIG. 3 shows the values found when a footfall sound-proofing panel of expanded polystyrene EPS 34/30 (s'~10 MN/M³) is used.

From each of the three figures, it is clearly visible that the resulting decrease in room loudness level described above is only attained by the specific adjustment performed according to the invention between the individual layers of the composite sound insulating system, on one hand, because the vibration behavior and thus the sound projection properties of the thin, rigid wear surface are advantageously influenced, particularly in the frequency range above 800 Hz that is relevant for such surfaces, by sufficient acoustic insulation of this surface (the sound pressure levels in the room are distinctly reduced by up to 10 dB), and on the other hand, because the resonant frequency of the composite system (in each case to be found in the range between about 230 Hz and 630 HZ) is distinctly shifted towards lower frequencies relative to the resonant frequency of the "naked" rigid, acoustically stiff wear surface (which has a flat part of the curve in the region between 1000 and 4000 Hz).

Finally, even the well-known rattling noise which occurs when walking on thin, rigid wear surfaces and is highly unpleasant subjectively, can be suppressed when these two effects are superimposed, which always occurs in practice. This requirement in fact was the starting point for the development of the composite system according to the invention.

It is clearly visible that relative to the frequency-dependent sound pressure level in the room [in dB] found by excitation with a standard hammer mill for a commercially available thin, acoustically stiff wearing surface X7.6, the other two functions are clearly lowered by the combination according to the invention, particularly in the range of higher frequencies (above 1000 Hz). In the range of lower frequencies, the composite sound insulation system according to the invention will lead to such a lowering, only after optimization.

This optimization occurs by specific selection of the dimensions of the air blister sheet in the direction of low dynamic stiffnesses, with values below 10 MN/m³; this causes the resonant frequency of the entire composite system to be lowered so much that the strong drop in sound pressure level actually attained in the upper frequency range will already start in the range of low frequencies. This implies that in addition to preventing the unpleasant rattle that occurs when walking on the floorings, the resulting sound pressure level in the room is also clearly lowered.

The composite sound insulation system according to the invention can be used, not only for floorings consisting of presspan panels but bascially for all floor structures lacking floating floor screeds, though always with load-distributing wear surfaces.

Figure 4:
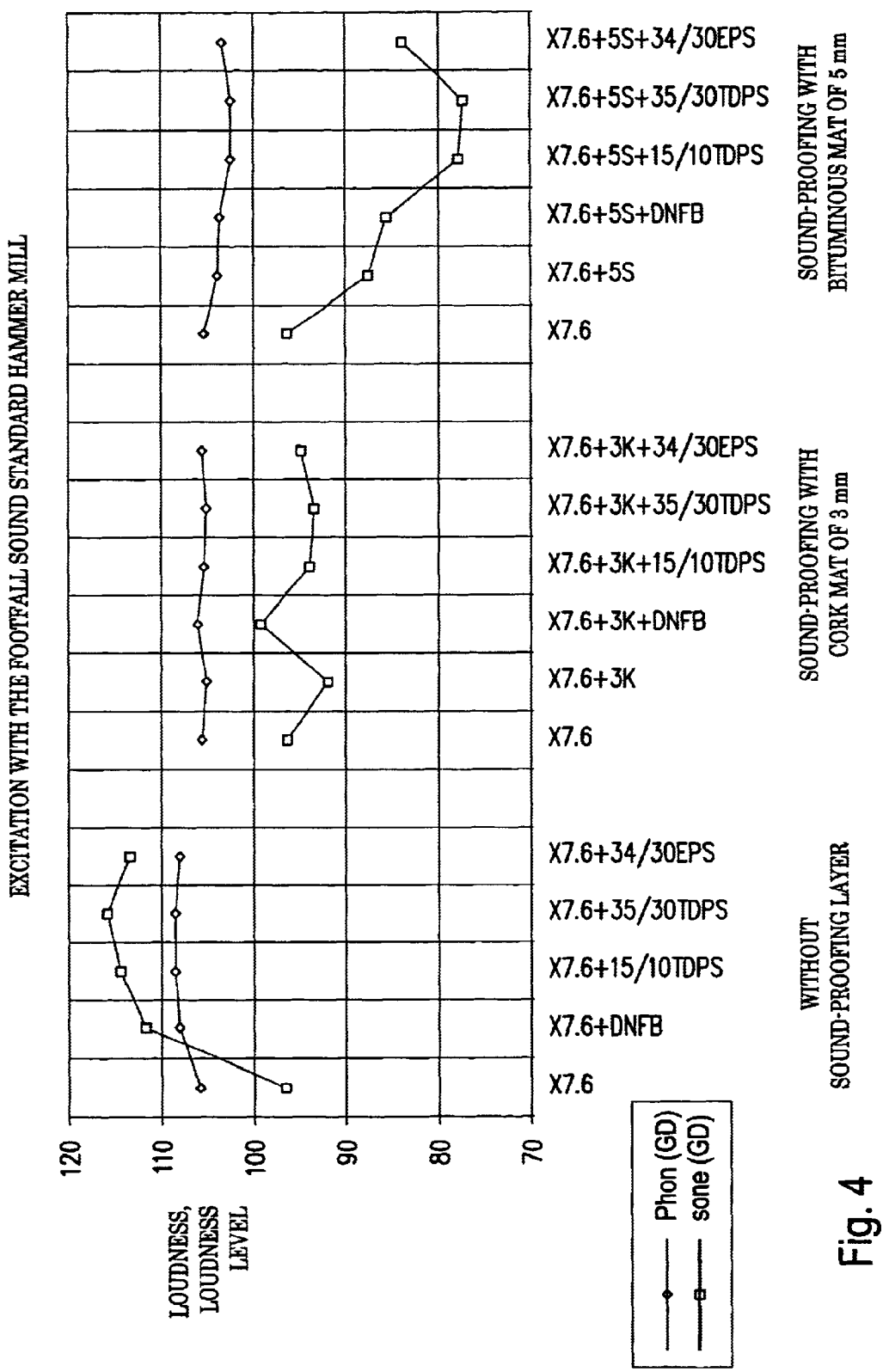

FIG. 4 summarizes in three groups the improvements attained in laboratory tests which were started with the noninsulated rigid, acoustically stiff wear surface, subsequently combined with two different insulating materials (cork, bitumen) and with a total of four layers technically effective with respect to footfall sound insulation (in addition to the materials cited above in FIGS. 1 to 3, a mineral fiber insulating panel TDPS 15/10 was used). The three groups correspond to the situations of noninsulated flooring (to the left), flooring insulated with a cork layer 3 mm thick (in the center), and flooring insulated with a bitumen layer 5 mm thick (to the right).

The dynamic stiffnesses of the three different footfall sound materials used are those cited above for FIGS. 1 to 3. Evidently because of the inner loss factor $\eta_{int}$ of cork, which is as yet relatively low, the effects that can be attained with cork are still unsatisfactory, so that this material is not preferred when thin layers are applied.

The realization underlying selection of the composite sound insulation system object of the invention that even the inner attenuation of the footfall sound-proofing layer is important for the sound projection properties of a wear surface, is documented in the measurements by the finding that the corresponding two loudness levels (in sones) which are attained with mineral fiber footfall attenuating panels of different thickness and different dynamic stiffness (TDPS 35/30 and TDPS 15/10) are practically identical.

The air blister double sheet DNFB which is only about 10 mm thick and thus serves to economize structural thickness, despite its still relatively high dynamic stiffness of s'~20 MN/m³, leads to a loudness level in the room which is only 1.8 sones higher, i.e., inconsequentially higher, than that attained when using a commercial footfall sound-proofing panel of expanded polystyrene (EPS 34/30, s'~10 MN/m³) which is three times thicker. Even this effect can find a physical explanation, only in the fact that the air blister double sheet itself has a high inner attenuation via the numerous bridges consisting of plastic, and it is this attenuation which in the end is responsible for the surprisingly favorable result of comparative tests concerning the sound projected into the room—surprising even for those skilled in the art.

The resulting sound pressure levels first measured (in dB) for the individual combinations of the composite system have then been recalculated to the units of phons (loudness) or sones (loudness level) relevant for the auditory perception of the human ear in order to more clearly express the effects produced by the technical sound-proofing precautions taken, according to the invention, primarily to improve the sound projection properties (room acoustics) of thin, rigid wear surfaces, on the subjective auditory perception of a tenant.

The first group of loudness levels (to the left) clearly shows that with the mere combination of a thin, rigid wear surface and a footfall sound-proofing layer that appeared evident at first, a striking deterioration of the acoustical situation in the room is obtained instead of a desired decrease of the resulting sound level in the room, and this deterioration is even more important for smaller dynamic stiffnesses of the footfall sound-proofing layer (which as such should actually be more favorable).

The group in the middle represents the situation where the wear surface is first insulated on its bottom side with a cork layer 3 mm thick, and then once more combined with the four different footfall sound layers. The acoustic insulation of the wear surface with a cork layer combined with the footfall sound-proofing materials does lower the loudness levels which arise when the combination is excited with the standard hammer mill, but relative to the sole wear surface without insulating layer, a significant decrease in noise level in the room is not achieved.

In the group to the right, however, which corresponds to the layer arrangements of the composite sound insulation system according to the invention, the loudness levels in the walking room are 10 to 20 sones below those found for the sole wear surface without insulating layer. The most effective decrease in loudness level demonstrated, by 20 sones, implies a subjective improvement by about 20%; it is attained when using a footfall sound-proofing material having a dynamic stiffness of $\leq 10$ MN/m$^3$.

Figure 5A:
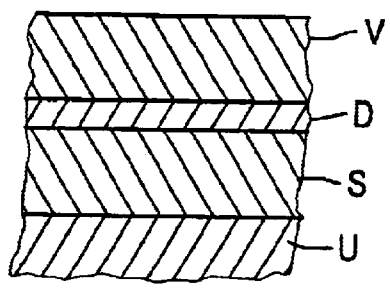
FIGS. 5a–5c show the different variants of the invention in cross section.
Figure 5B:
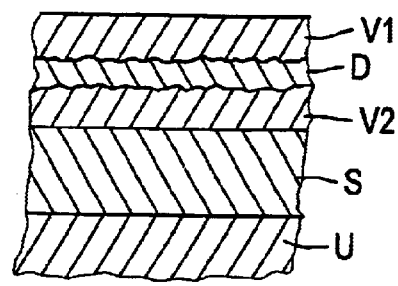
Figure 5C:
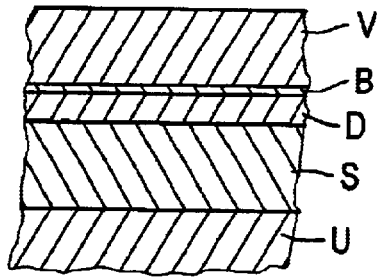

The sound-proofing layer D according to the invention can be arranged in different ways, as seen from FIGS. 5a–5c. It can be bonded adhesively, for instance, either with the bottom side of the covering layer V or with the top side of the footfall sound-proofing layer S which with its bottom side rests on the sub-floor U (FIG. 5a); it can also be formed as the core of the covering layer V or arranged between two plies V1, V2 of this layer V (FIG. 5b). Between the covering layer V and the sound-proofing layer D, a vapor control or vapor seal B can be arranged, which may take the form of a heating foil or may be present in addition to a heating foil (FIG. 5c). The thickness ratios shown in FIGS. 5a–5c should not be seen as limiting. For instance, the covering layer V of FIG. 5a can be thinner (for instance, a molded fiberboard 5 mm thick, or a laminated layer, so long as this will only have a load-distributing function) than the sound-proofing layer D, while the latter (being much thicker) is formed as supporting layer which attains the high inner loss factor $\eta_{int}$ that is desired, by special selection of additives.

Figure 6:
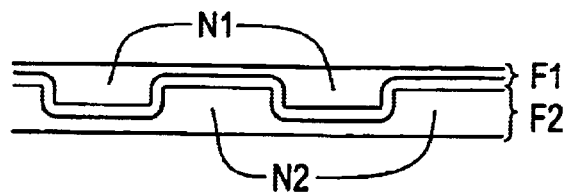
FIG. 6 shows an embodiment of an air blister double sheet designed to realize the invention.

FIG. 6 shows in cross section an example of the air blister double sheet that is preferred according to the invention. Between the two layers F1, F2 of an air blister sheet, air gaps are only present in the drawing in order to make it more intelligible; in reality, of course, the two air blister sheets are welded together between the blisters. The blisters N1 of the first air blister sheet F1 mesh between the blisters N2 of the other air blister sheet F2, for instance chessboardlike or in a hexagonal arrangement. The blister dimensions and distances as well as the number of layers and perhaps interlayers are selected so that an even lower dynamic stiffness is attained.

By gluing the sound-proofing layer according to the invention, which consists of materials of very high density, for instance to the bottom side of the wear surface, the mass per unit area of the thin wear surface (or if applicable, that of a thin wall covering) is raised to such a decisive extent that in combination with the low dynamic stiffness of the footfall sound-proofing layer in the composite sound insulation system and with massive base structures (and the analogous items in the wall or ceiling zone) the overall system attains a resonant frequency which is so low that this system is fundamentally functional as well with respect to aerial noise or can be used as sound-absorbing panels for the purposes of room acoustics.

What is claimed is:

1. A composite sound insulation system for a room boundary surface, comprising:
   (i) a floor, wall, or ceiling covering;
   (ii) a sound-attenuating layer adjoining the corresponding covering, which has an inner loss factor $\eta_{int}$ of at least 0.1 and at least one of the following properties:
      a maximum thickness of 10 mm,
      a density of >1600 kg/m$^3$, or
      a weight per unit area of >5 kg/m$^2$; and
   (iii) a sound-proofing layer adjacent to the room boundary surface which has a dynamic stiffness of at most 20 MN/m$^3$.

2. The composite sound insulation system according to claim 1, wherein the covering is formed in two parts and the sound-attenuating layer is arranged between the two parts or one of the parts of the covering is formed as the sound-attenuating layer.

3. The composite sound insulation system according to claim 1, further comprises a vapor control or vapor seal arranged between the covering and the sound-attenuating layer, which may be formed as a heating foil or may be present in addition to the heating foil.

4. The composite sound insulation system according to claim 1, wherein the sound-proofing layer is designed as a multiple air blister sheet, where appropriate, with at least one intermediate layer.

5. The composite sound insulation system according to claim 1, further comprises an interlayer arranged between the sound-attenuating layer and the sound-proofing layer, said interlayer has values between the sound-attenuating layer and the sound-proofing layer.

6. The composite sound insulation system according to claim 5, wherein said sound-proofing layer is formed as an air blister sheet and the interlayer is formed as a rubber mat bearing bars or blisters which project into interstices between the air blisters of the air blister sheet.

7. The composite sound insulation system according to claim 1, further comprises at least two adjacent layers among the layers, said layers made from a same material, said material has a density which decreases from the covering in the direction of the room boundary surface in such a way that a side facing in the direction of the covering has the desired, high inner loss factor $\eta_{int}$ and a side facing in the direction of the room boundary surface has the desired, low dynamic stiffness.

8. The composite sound insulation system according to claim 4, wherein said air blister sheet is formed from sheets having high gas tightness.

9. The composite sound insulation system according to claim 1, wherein said sound-attenuating layer has an inner loss factor $\eta_{int}$ of at least 0.2.

10. The composite sound insulation system according to claim 1, wherein said sound-attenuating layer has a maximum thickness of 5 mm.

11. The composite sound insulation system according to claim 1, wherein said sound-attenuating layer has a density of >2000 kg/m$^3$.

12. The composite sound insulation system according to claim 1, wherein said sound-attenuating layer has a weight per unit area of >10 kg/m$^2$.

13. The composite sound insulation system according to claim 1 wherein said sound-proofing layer has a dynamic stiffness of at most 10 MN/m$^3$.

14. The composite sound insulation system according to claim 4, wherein the two air blister sheets are placed face to face in such a way that blisters of the first air blister sheet mesh with interstices of blisters of the second air blister sheet.

15. The composite sound insulation system according to claim 7, wherein said sound-attenuating layer, said sound-proofing layer and an interlayer are made from a same material, the material has a density which decreases from the covering in the direction of the room boundary surface in such a way that a side facing in the direction of the covering has the desired, high inner loss factor $\eta_{int}$ and a side facing in the direction of the room boundary surface has the desired, low dynamic stiffness.

16. The composite sound insulation system according to claim 1, wherein said sound-proofing layer has a thickness of between 5 mm to at most 20 mm.

17. The composite sound insulation system according to claim wherein said sound-proofing layer has a thickness of between 5 mm to at most 10 mm.

18. The composite sound insulation system according to claim 2, further comprises a vapor control or vapor seal arranged between the covering and the sound-attenuating layer, which may be formed as a heating foil or may be present in addition to the heating foil.

* * * * *